(12) United States Patent
Lee et al.

(10) Patent No.: US 9,873,084 B2
(45) Date of Patent: Jan. 23, 2018

(54) REDUCING AGENT PYROLYSIS SYSTEM FOR SELECTIVE CATALYTIC REDUCTION APPARATUS

(71) Applicant: Doosan Engine Co., Ltd., Gyeongsangnam-do (KR)

(72) Inventors: Jae Moon Lee, Gyeongsangnam-do (KR); Sang Jin Kim, Gyeongsangnam-do (KR); Jong Tae Choi, Gyeongsangnam-do (KR); Chang Hee Lee, Gyeongsangnam-do (KR)

(73) Assignee: Doosan Engine Co., Ltd., Gyeongsangnam-do (KR)

( * ) Notice: Subject to any disclaimer, the term of this patent is extended or adjusted under 35 U.S.C. 154(b) by 128 days.

(21) Appl. No.: 14/901,167

(22) PCT Filed: Dec. 6, 2013

(86) PCT No.: PCT/KR2013/011298
§ 371 (c)(1),
(2) Date: Dec. 28, 2015

(87) PCT Pub. No.: WO2014/208841
PCT Pub. Date: Dec. 31, 2014

(65) Prior Publication Data
US 2016/0129397 A1    May 12, 2016

(30) Foreign Application Priority Data
Jun. 28, 2013   (KR) .................. 10-2013-0075324

(51) Int. Cl.
*B01D 53/94* (2006.01)
*F01N 3/20* (2006.01)

(52) U.S. Cl.
CPC ......... *B01D 53/9431* (2013.01); *F01N 3/208* (2013.01); *F01N 3/2033* (2013.01);
(Continued)

(58) Field of Classification Search
None
See application file for complete search history.

(56) References Cited

U.S. PATENT DOCUMENTS

| 2009/0205324 A1* | 8/2009 | Girard ................ B01D 53/90 60/295 |
| 2011/0061374 A1* | 3/2011 | Noritake .............. F01N 3/035 60/286 |

(Continued)

FOREIGN PATENT DOCUMENTS

| EP | 2465602 A2 * | 6/2012 | .......... B01F 3/04049 |
| EP | 2628913 A1 * | 8/2013 | ........... F01N 3/2033 |

(Continued)

OTHER PUBLICATIONS

Yim et al. Decomposition of Urea into NH3 for the SCR Process. Ind. Eng. Chem. Res. 2004, pp. 4856-4663. http://pubs.acs.org/doi/pdf/10.1021/ie034052j.*

*Primary Examiner* — Walter D. Griffin
*Assistant Examiner* — Jelitza M Perez
(74) *Attorney, Agent, or Firm* — Young Basile Hanlon & MacFarlane, P.C.

(57) ABSTRACT

A reducing agent pyrolysis system for a selective catalytic reduction apparatus includes an elbow duct that is installed on an exhaust duct at a front end of a reactor, allows exhaust gas to flow into the elbow duct, and allows the inflow exhaust gas to be discharged toward the reactor. An inner pipe unit is disposed in the elbow duct, and allows a part of the exhaust gas to flow into and be discharged from the inner pipe unit. A heating device is installed in the inner pipe unit, and heats the exhaust gas flowing into the inner pipe unit. A nozzle is installed in the inner pipe unit, is disposed at a rear end of the heating device based on a flow of the exhaust gas, and injects a reducing agent into the inner pipe unit.

10 Claims, 2 Drawing Sheets

(52) U.S. Cl.
CPC .... *F01N 3/2066* (2013.01); *B01D 2251/2067* (2013.01); *F01N 2240/14* (2013.01); *F01N 2240/20* (2013.01); *F01N 2610/02* (2013.01); *F01N 2610/1453* (2013.01); *Y02T 10/24* (2013.01); *Y02T 10/26* (2013.01)

(56) References Cited

U.S. PATENT DOCUMENTS

| | | |
|---|---|---|
| 2011/0258968 A1 | 10/2011 | Weder |
| 2011/0258987 A1 | 10/2011 | Miebach et al. |
| 2013/0164182 A1 | 6/2013 | Iijima et al. |

FOREIGN PATENT DOCUMENTS

| | | |
|---|---|---|
| JP | 2008038670 A | 2/2008 |
| JP | 2008196479 A | 8/2008 |
| JP | 2009024503 A | 2/2009 |
| JP | 2010001895 A | 1/2010 |
| JP | 2010096005 A | 4/2010 |
| JP | 2013-002337 A | 1/2013 |
| KR | 2011-0078454 A | 7/2011 |

\* cited by examiner

REDUCING AGENT PYROLYSIS SYSTEM FOR SELECTIVE CATALYTIC REDUCTION APPARATUS

TECHNICAL FIELD

The present disclosure relates to a reducing agent pyrolysis system for a selective catalytic reduction apparatus, and more particularly, to a reducing agent pyrolysis system for a selective catalytic reduction apparatus in which an inner pipe is disposed in a main pipe, exhaust gas flowing into the inner pipe is heated when the exhaust gas flows into the inner pipe, and a reducing agent is injected into the heated exhaust gas.

BACKGROUND

In general, exhaust gas is produced when diesel engines, boilers, incinerators and the like are operated. Nitrogen oxide (NOx) is contained in exhaust gas. A selective catalytic reduction (SCR) apparatus is used to reduce nitrogen oxide.

The selective catalytic reduction apparatus serves to inject a reducing agent into exhaust gas to reduce nitrogen oxide contained in exhaust gas by reducing the nitrogen oxide to nitrogen and water. Urea is used as the reducing agent for reducing nitrogen oxide.

In the selective catalytic reduction apparatus, a system, which injects a reducing agent by using urea as the reducing agent, refers to a reducing agent injection system (urea dosing system).

Regarding the reducing agent injection system, a technology, in which exhaust gas is heated by using a reducing agent pyrolysis (decomposition) system, and a reducing agent is injected into the heated exhaust gas to further promote a reducing action, has been known.

A configuration of the reducing agent pyrolysis system includes a blower, a heating device, a decomposition chamber, an ammonia injection grid (AIG), and a urea supply module. The blower supplies fresh air into the decomposition chamber. The heating device serves to thermally decompose urea, and an electric heater, an oil burner, a plasma burner, a gas type burner, or the like is used as the heating device. The decomposition chamber provides a space in which urea is thermally decomposed. The ammonia injection grid supplies a reactor with ammonia ($NH_3$) which is produced by thermally decomposing urea. The urea supply module delivers a reducing agent from a urea tank to the decomposition chamber, and the urea supply module adopts a quantitative control pump or a mass flow controller (MFC).

An operation of the reducing agent pyrolysis system known in the related art will be described in accordance with an operational sequence.

A method of injecting ammonia ($NH_3$) by using the reducing agent pyrolysis system is applied to a case in which a temperature of exhaust gas is approximately below 250° C. It has been known that a temperature of exhaust gas discharged from engines, boilers, incinerators and the like is below 250° C.

Fresh air is supplied into the heating device at a front end or a rear end of the reactor by using a blower.

The heating device heats the reducing agent to a temperature level from 400° C. to 600° C., and the heated reducing agent is supplied into the decomposition chamber.

The heated reducing agent is injected into the decomposition chamber by the urea supply module and the nozzle.

When the heated reducing agent is injected, the reducing agent is thermally decomposed into ammonia ($NH_3$) and isocyanic acid (HNCO) by heat in the decomposition chamber. The ammonia and the isocyanic acid, which has been decomposed, are supplied into the reactor by the ammonia injection grid installed in the exhaust duct.

When the ammonia injection grid is applied, a distance from the reactor is shorter than that in a method of directly injecting the reducing agent.

However, in comparison with the method of directly injecting the reducing agent, the method of injecting ammonia by using the reducing agent pyrolysis system has problems in that a large number of additional components are required, the aforementioned many constituent elements thus need to be disposed, and as a result, a large space is occupied.

In addition, the reducing agent pyrolysis system known in the related art has problems in that piping is complicatedly configured to deliver the reducing agent between the constituent elements, and as a result, facility costs are increased.

In addition, the reducing agent pyrolysis system known in the related art has problems in that energy (electric power, fuel, or air pressure) and costs are additionally required to operate the blower and the heating device.

On the other hand, Korean Patent No. 10-1236305, Apparatus for Removing Nitrogen Oxides and Method for Removing Nitrogen Oxides Thereof, discloses a configuration in which an inner container is disposed in an outer container, and a plurality of holes is formed in the inner container. However, according to Korean Patent No. 10-1236305, a flow rate of exhaust gas flowing into the inner container cannot be controlled, and thus an appropriate mixture ratio cannot be provided, and as a result, there is concern that the reducing agent will leak into the outside in a case in which the amount of the reducing agent is excessively larger than the flow rate of exhaust gas.

SUMMARY

In the present disclosure, a reducing agent pyrolysis system for a selective catalytic reduction apparatus is configured and capable of reducing a size of an external shape of the reducing agent injection system and a space occupied by the reducing agent injection system by disposing an inner pipe in a main pipe, disposing a heating device in the inner pipe, and injecting a reducing agent directly into the inner pipe.

The present disclosure provides a reducing agent pyrolysis system for a selective catalytic reduction apparatus, which is capable of reducing manufacturing costs and facility costs by omitting a blower from the reducing agent pyrolysis system in the related art and simplifying various types of piping lines for delivering a reducing agent.

The present disclosure provides a reducing agent pyrolysis system for a selective catalytic reduction apparatus, which is capable of reducing electric power consumption caused by an operation of a blower of the reducing agent pyrolysis system in the related art.

The present disclosure provides a reducing agent pyrolysis system for a selective catalytic reduction apparatus, which is capable of reducing operating costs such as fuel costs and air pressure consumption required for a heating device by selectively applying a method of directly injecting a reducing agent or a reducing agent pyrolysis method.

The present disclosure is not limited to the aforementioned technical problems. Other technical problems, which are not mentioned above, may be clearly understood from the following descriptions by those skilled in the art to which the present disclosure pertains.

To solve the aforementioned technical problems, a reducing agent pyrolysis system for a selective catalytic reduction apparatus according to the present disclosure includes: an elbow duct 10 which is installed on an exhaust duct at a front end of a reactor, allows exhaust gas to flow into the elbow duct 10, and allows the inflow exhaust gas to be discharged toward the reactor; an inner pipe unit 20 which is disposed in the elbow duct 10, and allows a part of the exhaust gas to flow into and be discharged from the inner pipe unit 20; a heating device 60 which is installed in the inner pipe unit 20, and heats the exhaust gas flowing into the inner pipe unit 20; and a nozzle 70 which is installed in the inner pipe unit 20, and disposed at a rear end of the heating device 60 based on a flow of the exhaust gas, and injects a reducing agent into the inner pipe unit 20.

In addition, in the reducing agent pyrolysis system for a selective catalytic reduction apparatus according to the present disclosure, the elbow duct 10 may have a first main pipe 12 and a second main pipe 14 which are disposed and connected at a right angle or an obtuse angle, and the first and second main pipes 12 and 14 may have a greater size than the exhaust duct.

In addition, the reducing agent pyrolysis system for a selective catalytic reduction apparatus according to the present disclosure may further include an orifice unit 40 which is positioned in the first main pipe 12, in which an opening 42 is formed in the orifice unit 40, and an end of the inner pipe unit 20, which is positioned at a portion where the exhaust gas flows in, is disposed in the opening 42.

In addition, the reducing agent pyrolysis system for a selective catalytic reduction apparatus according to the present disclosure may further include a valve unit 30 which is installed at a portion of the inner pipe unit 20 where the exhaust gas flows in, in which a flow rate of the exhaust gas flowing into the inner pipe unit 20 is controlled by controlling an opening and closing operation of the valve unit 30.

In addition, the reducing agent pyrolysis system for a selective catalytic reduction apparatus according to the present disclosure may further include a mixer unit 80 which is installed at a portion of the inner pipe unit 20 where the exhaust gas is discharged, in which the reducing agent and the exhaust gas are mixed by the mixer unit 80.

In addition, the mixer unit 80 of the reducing agent pyrolysis system for a selective catalytic reduction apparatus according to the present disclosure may be coated with an oxidation catalyst ($TiO_2$).

In addition, in the reducing agent pyrolysis system for a selective catalytic reduction apparatus according to the present disclosure, the exhaust gas flowing into the inner pipe unit 20 may be heated to 450° C. to 600° C. by an operation of the heating device 60.

In addition, in the reducing agent pyrolysis system for a selective catalytic reduction apparatus according to the present disclosure, the reducing agent may be a urea solution, and the urea solution may be thermally decomposed into ammonia ($NH_3$) and isocyanic acid (HNCO) in the inner pipe unit 20.

In addition, in the reducing agent pyrolysis system for a selective catalytic reduction apparatus according to the present disclosure, when a temperature of the exhaust gas flowing into the elbow duct 10 is higher than a preset temperature t1, the heating device 60 may not be operated, and the reducing agent may be injected toward the reactor.

Other detailed matters of the exemplary embodiment are included in the detailed description and the drawings.

The reducing agent pyrolysis system for a selective catalytic reduction apparatus according to the present disclosure, which is configured as described above, may reduce a size of an external shape of the reducing agent injection system and reduce a space occupied by the reducing agent injection system by disposing the inner pipe in the main pipe, disposing the heating device in the inner pipe, and injecting the reducing agent directly into the inner pipe.

In addition, the reducing agent pyrolysis system for a selective catalytic reduction apparatus according to the present disclosure may reduce manufacturing costs and facility costs by omitting a blower from the reducing agent pyrolysis system in the related art and simplifying various types of piping lines for delivering the reducing agent.

In addition, the reducing agent pyrolysis system for a selective catalytic reduction apparatus according to the present disclosure may reduce electric power consumption caused by an operation of a blower of the reducing agent pyrolysis system.

In addition, the reducing agent pyrolysis system for a selective catalytic reduction apparatus according to the present disclosure may reduce operating costs such as fuel costs and air pressure consumption required for the heating device by selectively applying a method of directly injecting a reducing agent or a reducing agent pyrolysis method.

DETAILED DESCRIPTION

Figure 1:
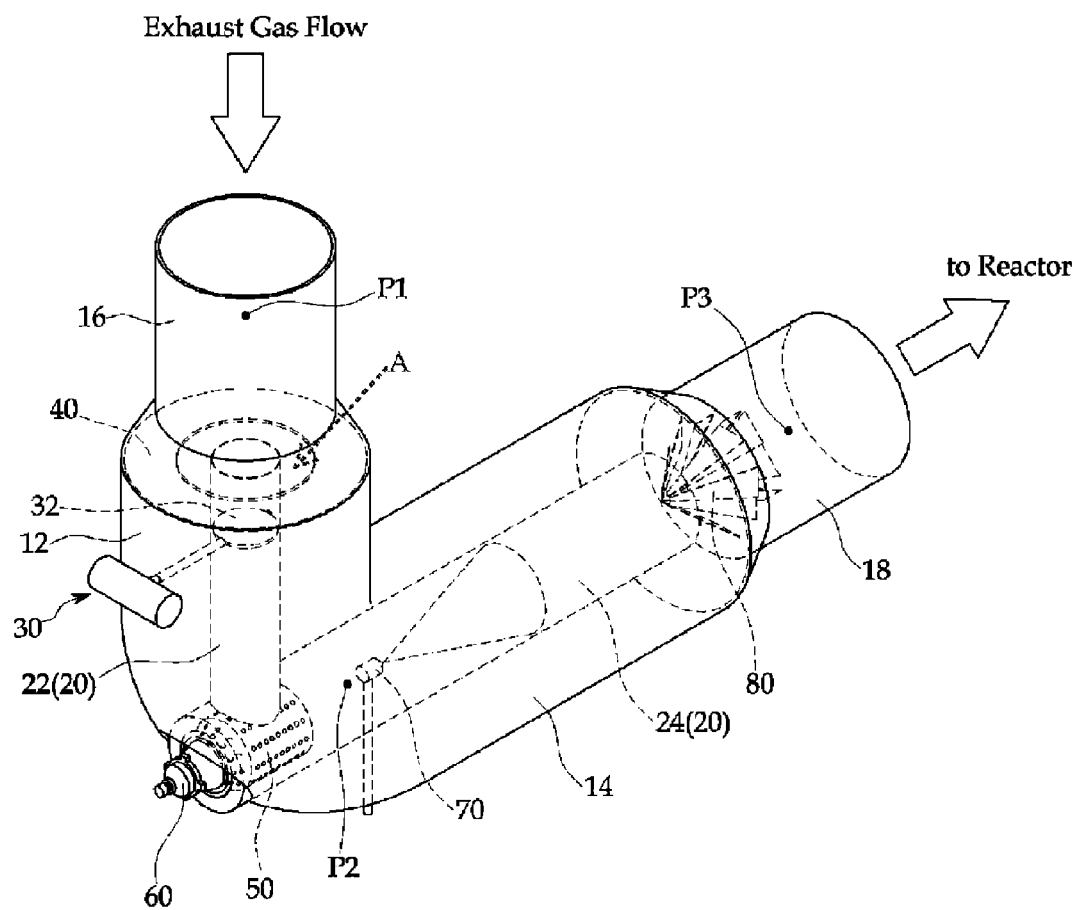
FIG. 1 is a perspective view for explaining a reducing agent pyrolysis system for a selective catalytic reduction apparatus according to an exemplary embodiment of the present disclosure.

Advantages and features of the present disclosure and methods of achieving the advantages and features will be clear with reference to exemplary embodiments described in detail below together with the accompanying drawings.

Hereinafter, an exemplary embodiment of the present disclosure will be described in detail with reference to the accompanying drawings. It should be appreciated that the exemplary embodiments, which will be described below, are illustratively described to help understand the present disclosure, and the present disclosure may be modified to be variously carried out differently from the exemplary embodiments described herein. However, in the description of the present disclosure, the specific descriptions and illustrations of publicly known functions or constituent elements will be omitted when it is determined that the specific descriptions and illustrations may unnecessarily obscure the subject matter of the present disclosure. In addition, to help understand the present disclosure, the accompanying drawings are not illustrated based on actual scales, but parts of the constituent elements may be exaggerated in size.

Meanwhile, the terms used in the description are defined considering the functions of the present disclosure and may vary depending on the intention or usual practice of a manufacturer. Therefore, the definitions should be made based on the entire contents of the present specification.

A reducing agent pyrolysis system according to an exemplary embodiment of the present disclosure refers to an apparatus which is applied to a selective catalytic reduction apparatus applied to engines, boilers, incinerators, and the like.

In addition, in the reducing agent pyrolysis system according to the exemplary embodiment of the present disclosure, a heating device and a thermal decomposition chamber are installed in an exhaust duct, a part of exhaust gas is heated, and a reducing agent is injected under a high-temperature environment. Various types of burners may be used as a heating device 60, and an inner pipe unit 20 serves as the thermal decomposition chamber. In addition, both ends of an inlet and an outlet of an elbow duct 10 are connected to the exhaust duct.

Like reference numerals indicate like elements throughout the specification.

Hereinafter, the reducing agent pyrolysis system for a selective catalytic reduction apparatus according to the exemplary embodiment of the present disclosure will be described with reference to FIGS. 1 and 2.

Figure 2:
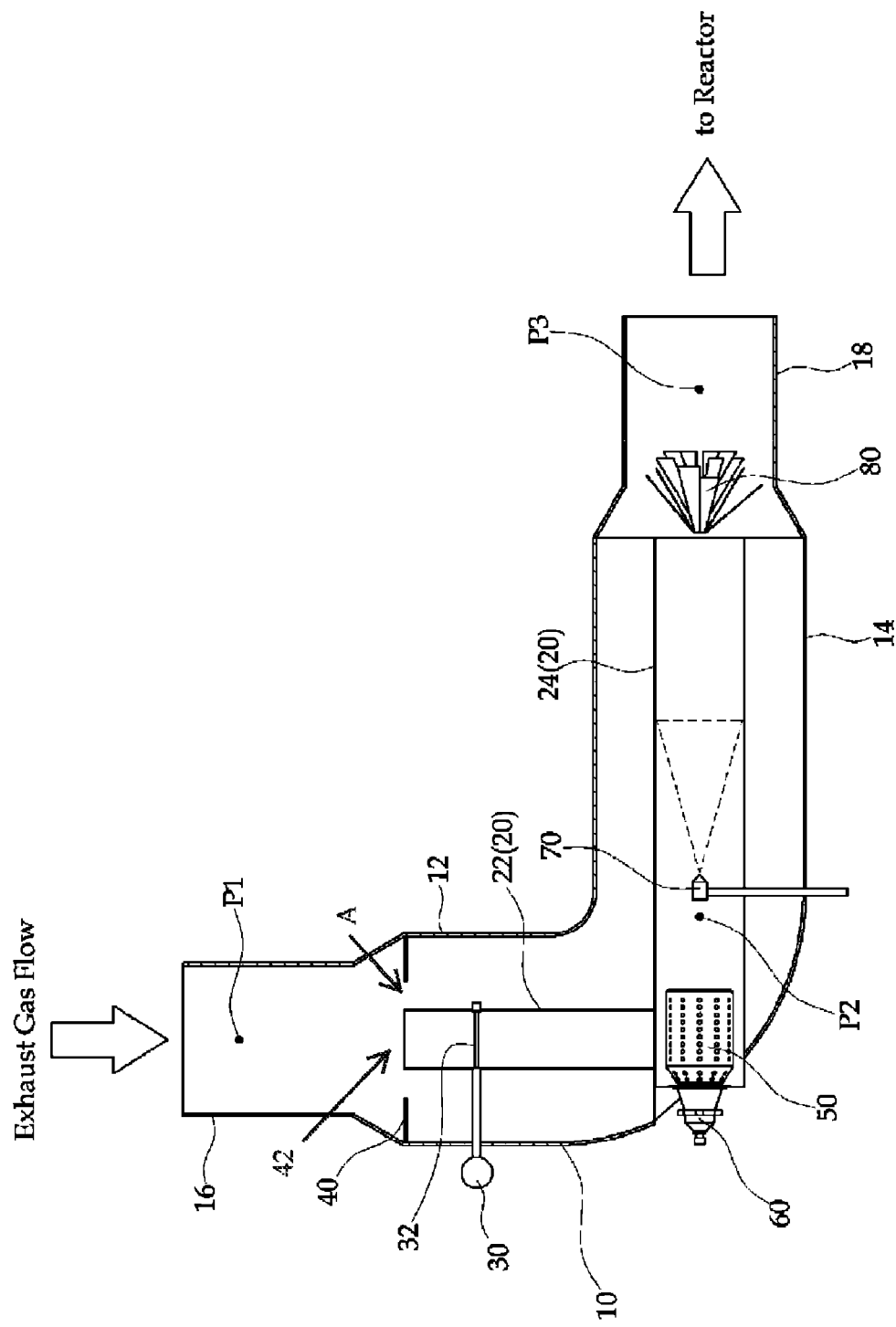
FIG. 2 is a cross-sectional view for explaining the reducing agent pyrolysis system for a selective catalytic reduction apparatus according to the exemplary embodiment of the present disclosure.

The attached FIGS. 1 and 2 are a perspective view and a cross-sectional view for explaining the reducing agent pyrolysis system for a selective catalytic reduction apparatus according to the exemplary embodiment of the present disclosure, respectively.

In the reducing agent pyrolysis system according to the exemplary embodiment of the present disclosure, the inner pipe unit 20 is disposed in the elbow duct 10, and the heating device 60 is provided at one side of the inner pipe unit 20.

The elbow duct 10 is formed by connecting a first main pipe 12 and a second main pipe 14 at a predetermined angle. The predetermined angle formed between the first main pipe 12 and the second main pipe 14 may be a right angle or an obtuse angle. In a case in which the predetermined angle is a right angle, it is possible to improve manufacturing convenience. In a case in which the predetermined angle is an obtuse angle, it is possible to maintain an excellent flow of a fluid (exhaust gas) by preventing a flow velocity of the fluid from being decreased.

In addition, an inlet pipe 16 may be connected to an inflow end of the first main pipe 12, and the inlet pipe 16 is connected with a pipe into which exhaust gas flows. A discharge pipe 18 may be connected to a discharge end of the second main pipe 14, and the discharge pipe 18 is connected with a reactor.

Meanwhile, the first main pipe 12 may have a greater diameter than the inlet pipe 16, and similarly, the second main pipe 14 may have a greater diameter than the discharge pipe 18.

The inner pipe unit 20 is formed by connecting a first inner pipe 22 and a second inner pipe 24 at a predetermined angle. The predetermined angle formed between the first inner pipe 22 and the second inner pipe 24 may be a right angle or an obtuse angle. In a case in which the predetermined angle is a right angle, it is possible to improve manufacturing convenience. In a case in which the predetermined angle is an obtuse angle, it is possible to maintain an excellent flow of a fluid (exhaust gas) by preventing a flow velocity of the fluid from being decreased. On the other hand, the first inner pipe 22 may be disposed in parallel with the first main pipe 12, and similarly, the second inner pipe 24 may be disposed in parallel with the second main pipe 14.

A valve unit 30 is installed on the first inner pipe 22. A valve plate 32 of the valve unit 30 is disposed in the first inner pipe 22. The valve plate 32 is rotated by an operation of the valve unit 30, thereby opening and closing the first inner pipe 22. That is, it is possible to control a flow rate of exhaust gas flowing into the first inner pipe 22 by controlling the valve unit 30.

Meanwhile, an orifice unit 40 is disposed at a portion where the first main pipe 12 and the inlet pipe 16 are connected. An opening 42 is formed in the orifice unit 40. An end of the first inner pipe 22 is disposed in the opening 42. Meanwhile, a passage A is formed by the opening 42 of the orifice unit 40 and the first inner pipe 22.

When exhaust gas flows into the elbow duct 10, a part of the exhaust gas flows into the first main pipe 12, and the other part of the exhaust gas flows between the first main pipe 12 and the first inner pipe 22 through the passage A.

That is, the orifice unit 40 serves to increase pressure when exhaust gas passes through the opening 42, thereby guiding the exhaust gas to flow into the first inner pipe 22.

A support frame 50 may be provided in the second inner pipe 24, and the heating device 60 may be installed in the support frame 50. The support frame 50 fixes the heating device 60. The heating device 60 heats the exhaust gas flowing into the first inner pipe 22.

In addition, a nozzle 70 is disposed in the second inner pipe 24. The nozzle 70 is disposed to penetrate the second inner pipe 24 and the second main pipe 14. A reducing agent is supplied through piping, and then injected from the nozzle 70.

In addition, a mixer unit 80 may be disposed at an outlet side end of the second inner pipe 24. The mixer unit 80 may be positioned inside a portion where the second main pipe 14 and the discharge pipe 18 are connected. The mixer unit 80 promotes mixture of the exhaust gas and the reducing agent. In addition, the mixer unit 80 mixes the exhaust gas flowing inside the second inner pipe 24 and the exhaust gas flowing outside the second inner pipe 24.

Meanwhile, the mixer unit 80 may be coated with an oxidation catalyst ($TiO_2$) and the like, and as a result, it is possible to hydrolyze isocyanic acid (HNCO) into ammonia ($NH_3$) and water ($H_2O$) by an action of the oxidation catalyst.

On the other hand, whether to operate the reducing agent pyrolysis system according to the exemplary embodiment of the present disclosure may be determined depending on a temperature of exhaust gas. A first temperature sensor p1 may be disposed in the inlet pipe 16 in order to measure a temperature of exhaust gas flowing into the inlet pipe 16, and a second temperature sensor p2 may be disposed between the heating device 60 and the nozzle 70 in order to measure a heating temperature. In addition, a third temperature sensor p3 may be disposed in the discharge pipe 18 in order to measure a temperature of exhaust gas being discharged from the discharge pipe 18.

Hereinafter, an operation of the reducing agent pyrolysis system according to the exemplary embodiment of the present disclosure will be described.

When exhaust gas flows into the elbow duct 10, a part of the exhaust gas flows into the inner pipe unit 20.

The heating device 60 heats the exhaust gas flowing into the inner pipe unit 20. A heating temperature may be 450° C. to 600° C. A temperature of the heated exhaust gas may be obtained from information measured by the second temperature sensor p2. In a case in which the heating temperature is 450° C. or higher, thermal decomposition of a urea solution may be smoothly carried out, thereby preventing generation of by-products. In addition, the heating temperature may be limited to 600° C., thereby reducing waste of energy by preventing the heating device 60 from being excessively operated.

The nozzle 70 injects the reducing agent. The reducing agent may be an aqueous solution formed by dissolving urea in water. In the urea solution, a mixture ratio of urea to water may be a level of 32.5% to 50%. In more detail, a mixture ratio of urea may be 32.5%, 40%, or 50%.

When the reducing agent, that is, the urea solution is injected through the nozzle 70, the urea solution is thermally decomposed into ammonia ($NH_3$) and isocyanic acid (HNCO). The ammonia and the isocyanic acid, which has been decomposed, are supplied into the reactor by the ammonia injection grid installed in the exhaust duct.

In the reactor, the ammonia reacts with nitrogen oxide (NOx) contained in exhaust gas by the catalyst, and is decomposed into nitrogen ($N_2$) and water ($H_2O$).

Meanwhile, in a case in which a temperature of the inflow exhaust gas is a preset temperature t1, for example, 280° C. or higher, the heating device 60 may not be used. The temperature of the inflow exhaust gas is based on temperature information detected by the first temperature sensor p1 disposed in the inlet pipe 16. That is, since the temperature of the exhaust gas is high, as high as the preset temperature t1, the heating device 60 is not used, and the urea solution flows in a direction of the reactor, such that the reducing agent pyrolysis system may be used according to a method of directly injecting the reducing agent.

The preset temperature t1 may be changed depending on the amount of sulfur contained in fuel or a system processing arrangement.

On the other hand, in a case in which a temperature at a rear end of the mixer unit 80 is decreased to 250° C. or lower when the heating device 60 is operated and the reducing agent is injected, the heating temperature of the heating device 60 is increased, or a flow rate of the inflow exhaust gas is increased by operating the valve unit 30, thereby increasing a heat flow rate. As a result, a temperature at the rear end of the mixer unit 80 may be maintained to be 250° C. or higher. The temperature at the rear end of the mixer unit 80 is determined based on information detected by the third temperature sensor p3.

If a temperature of exhaust gas is decreased to 250° C. or lower after the reducing agent is injected, by-products (biuret, cyanuric acid, melamine, ammeline etc.) may be produced, such that the heating device 60 is operated to further heat the exhaust gas or the valve unit 30 is further opened in order to prevent the production of the by-products.

On the other hand, the elbow duct 10 is configured such that the inner pipe unit 20 is disposed in the elbow duct 10. The first and second main pipes 12 and 14, which constitute the elbow duct 10, have a greater size than a general exhaust duct. Therefore, it is possible to minimize differential pressure in the exhaust duct in which exhaust gas flows.

The increased size of the first and second main pipes 12 and 14 may be set to a level at which the increased size of the first and second main pipes 12 and 14 may be supplemented at least with a cross-sectional area of the inner pipe unit 20. For example, assuming that a size of a general exhaust duct is 1400 A and a size of the first inner pipe 22 is 600 A, a size of the first main pipe 12 may be set to a level of 1520 A.

In addition, the size may be set in consideration of manufacturing convenience. For example, when a size of the first main pipe 12 is considered as a level of 1520 A, the size of the first main pipe 12 may be set to 1600 A in consideration of manufacturing convenience.

On the other hand, the reducing agent pyrolysis system for a selective catalytic reduction apparatus according to the exemplary embodiment of the present disclosure may control a flow rate of the inflow exhaust gas, and as a result, the reducing agent may be mixed in consideration of a degree of contamination of exhaust gas and an appropriate mixture ratio, such that the reducing agent may be thermally decomposed in the inner pipe unit 20 without leaking, thereby increasing thermal decomposition efficiency.

The exemplary embodiment of the present disclosure has been described with reference to the accompanying drawings, but those skilled in the art will understand that the present disclosure may be implemented in any other specific form without changing the technical spirit or an essential feature thereof.

Accordingly, it should be understood that the aforementioned exemplary embodiment is described for illustration in all aspects and are not limited, and the scope of the present disclosure shall be represented by the claims and it should be construed that all of the changes or modified forms induced from the meaning and the scope of the claims, and an equivalent concept thereto are included in the scope of the present disclosure.

The reducing agent pyrolysis system for a selective catalytic reduction apparatus according to the present disclosure may be used to inject the reducing agent into heated gas to be purified and mix the reducing agent with the gas.

A reference list for the abbreviations and drawing labels is as follows:

10: Elbow duct
12, 14: First and second main pipes
16: Inlet pipe
18: Discharge pipe
20: Inner pipe unit
22, 24: First and second inner pipes
30: Valve unit
32: Valve plate
40: Orifice unit
42: Opening
50: Support frame
60: Heating device
70: Nozzle
80: Mixer unit
A: Passage
P1, P2, P3: First, second, and third temperature sensors

The invention claimed is:

1. A reducing agent pyrolysis system for a selective catalytic reduction apparatus, the reducing agent pyrolysis system comprising:
    an elbow duct, which is installed on an exhaust duct at a front end of a reactor, allows exhaust gas to flow into the elbow duct, and allows the exhaust gas to be discharged toward the reactor;
    an inner pipe unit, which is disposed in the elbow duct and allows a part of the exhaust gas to flow into and be discharged from the inner pipe unit;
    a burner or electric heater, which is installed in the inner pipe unit and heats the exhaust gas flowing into the inner pipe unit;
    a nozzle, which is installed in the inner pipe unit, is disposed at a rear end of the burner or electric heater based on a flow of the exhaust gas, and injects a reducing agent into the inner pipe unit; and
    a valve unit, which is installed at a portion of the inner pipe unit where the exhaust gas flows in,
    wherein a flow rate of the exhaust gas flowing into the inner pipe unit is controlled by controlling an opening and closing operation of the valve unit.

2. The reducing agent pyrolysis system of claim 1, wherein the elbow duct has a first main pipe and a second main pipe that are disposed and connected at a right angle or an obtuse angle, and wherein the first main pipe and the second main pipe have a greater size than an exhaust duct.

3. The reducing agent pyrolysis system of claim 2, further comprising:
   an orifice unit, which is positioned in the first main pipe, wherein an end of the inner pipe unit is disposed inside an opening of the orifice unit.

4. The reducing agent pyrolysis system of claim 1, further comprising:
   a mixer unit, which is installed at a portion of the inner pipe unit where the exhaust gas is discharged,
   wherein the reducing agent and the exhaust gas are mixed by the mixer unit.

5. The reducing agent pyrolysis system of claim 4, wherein the mixer unit is coated with an oxidation catalyst.

6. The reducing agent pyrolysis system of claim 1, wherein the exhaust gas flowing into the inner pipe unit is heated to 450° C. to 600° C. by an operation of the burner or electric heater.

7. The reducing agent pyrolysis system of claim 1, wherein the reducing agent is a urea solution, and the urea solution is thermally decomposed into ammonia ($NH_3$) and isocyanic acid (HNCO) in the inner pipe unit.

8. The reducing agent pyrolysis system of claim 1, wherein when a temperature of the exhaust gas flowing into the elbow duct is higher than a preset temperature, the burner or electric heater is not operated, and the reducing agent is injected toward the reactor.

9. The reducing agent pyrolysis system of claim 3, further comprising:
   a mixer unit, which is installed at a portion of the inner pipe unit where the exhaust gas is discharged,
   wherein the reducing agent and the exhaust gas are mixed by the mixer unit.

10. The reducing agent pyrolysis system of claim 9, wherein the mixer unit is coated with an oxidation catalyst.

* * * * *